US010177387B2

(12) United States Patent
Miyatake et al.

(10) Patent No.: US 10,177,387 B2
(45) Date of Patent: Jan. 8, 2019

(54) BIPOLAR BATTERY CURRENT COLLECTOR THAT CONTRACTS TO INTERRUPT A FLOW OF ELECTRIC CURRENT IN A DIRECTION THEREOF AND BIPOLAR BATTERY

(71) Applicants: Kazuki Miyatake, Yokohama (JP); Kenji Hosaka, Yokohama (JP); Yoshio Shimoida, Yokosuka (JP); Hideaki Horie, Yokosuka (JP)

(72) Inventors: Kazuki Miyatake, Yokohama (JP); Kenji Hosaka, Yokohama (JP); Yoshio Shimoida, Yokosuka (JP); Hideaki Horie, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/880,815

(22) Filed: Oct. 12, 2015

(65) Prior Publication Data
US 2016/0043405 A1 Feb. 11, 2016

Related U.S. Application Data

(62) Division of application No. 13/202,635, filed as application No. PCT/JP2010/051084 on Jan. 28, 2010, now abandoned.

(30) Foreign Application Priority Data

Mar. 12, 2009 (JP) ................................. 2009-060124

(51) Int. Cl.
*H01M 4/66* (2006.01)
*H01M 2/34* (2006.01)
(Continued)

(52) U.S. Cl.
CPC ........... *H01M 4/668* (2013.01); *H01M 2/348* (2013.01); *H01M 4/66* (2013.01); *H01M 4/666* (2013.01);
(Continued)

(58) Field of Classification Search
CPC ........ H01M 2/348; H01M 4/66; H01M 4/666; H01M 4/668; H01M 10/637;
(Continued)

(56) References Cited

U.S. PATENT DOCUMENTS 4,164,068 A 8/1979 Shropshire et al.
4,920,017 A 4/1990 Herscovici
(Continued)

FOREIGN PATENT DOCUMENTS

CN 1633727 A 6/2005
CN 1677735 A 10/2005
(Continued)

OTHER PUBLICATIONS

"Polyethylene." The American Heritage Dictionary of the English Language. Boston: Houghton Mifflin, 2011. Credo Reference. Web. Feb. 12, 2015, 2 pages.
(Continued)

*Primary Examiner* — Gary D Harris
(74) *Attorney, Agent, or Firm* — Foley & Lardner LLP

(57) ABSTRACT

Provided is a bipolar battery current collector that includes a conductive resin layer formed in such a manner as to, when at least part of the conductive resin layer reaches a predetermined temperature, interrupts a flow of electric current through the at least part of the conductive resin layer in a vertical direction thereof. Also provided is a bipolar battery using the current collector. It is possible by the use of the
(Continued)

current collector to suppress local heat generation in the bipolar battery and improve the durability of the bipolar battery.

19 Claims, 8 Drawing Sheets

(51) Int. Cl.
    *H01M 10/637* (2014.01)
    *H01M 10/654* (2014.01)
    *H01M 10/613* (2014.01)
    *H01M 4/80* (2006.01)
    *H01M 10/647* (2014.01)
    *H01M 4/02* (2006.01)

(52) U.S. Cl.
    CPC ........... *H01M 4/80* (2013.01); *H01M 10/613* (2015.04); *H01M 10/637* (2015.04); *H01M 10/654* (2015.04); *H01M 4/663* (2013.01); *H01M 10/647* (2015.04); *H01M 2004/029* (2013.01); *H01M 2200/10* (2013.01); *H01M 2200/106* (2013.01)

(58) Field of Classification Search
    CPC .... H01M 10/654; H01M 10/613; H01M 4/80; H01M 4/663; H01M 2200/10; H01M 2004/029; H01M 10/647; H01M 2200/106
    USPC .................................................. 429/233, 245
    See application file for complete search history.

(56) References Cited

U.S. PATENT DOCUMENTS

| | | | |
|---|---|---|---|
| 5,141,828 A | 8/1992 | Bennion et al. | |
| 5,916,709 A * | 6/1999 | Arias | H01M 2/08 29/623.2 |
| 7,166,385 B2 | 1/2007 | Ishida et al. | |
| 7,481,853 B2 | 1/2009 | Ishida et al. | |
| 7,482,090 B2 | 1/2009 | Ishida et al. | |
| 7,807,283 B2 | 10/2010 | Tatebayashi et al. | |
| 2004/0018430 A1* | 1/2004 | Holman | H01M 4/13 429/233 |
| 2004/0041537 A1 | 3/2004 | Ishida et al. | |
| 2005/0221173 A1 | 10/2005 | Tatebayashi et al. | |
| 2006/0196042 A1 | 9/2006 | Ishida et al. | |
| 2007/0128464 A1* | 6/2007 | Jang | B32B 27/18 428/688 |
| 2008/0220330 A1 | 9/2008 | Hosaka et al. | |
| 2008/0241684 A1 | 10/2008 | Muraoka et al. | |
| 2008/0254355 A1 | 10/2008 | Muraoka et al. | |
| 2009/0057940 A1* | 3/2009 | Zhamu | C04B 35/522 264/49 |
| 2009/0130543 A1 | 5/2009 | Tatebayashi et al. | |
| 2009/0233164 A1* | 9/2009 | Shimamura | H01M 2/08 429/149 |

FOREIGN PATENT DOCUMENTS

| | | |
|---|---|---|
| CN | 101286576 A | 10/2008 |
| JP | 63-266774 A | 11/1988 |
| JP | 3-230477 A | 10/1991 |
| JP | 08-096792 A | 4/1996 |
| JP | 10-050294 A | 2/1998 |
| JP | 11-102711 A | 4/1999 |
| JP | 2004-164897 | 6/2004 |
| JP | 2006-190649 A | 7/2006 |
| JP | 2006-302616 A | 11/2006 |
| JP | 2007-180041 A | 7/2007 |
| JP | 2008-140552 A | 6/2008 |
| WO | WO-2006/061696 A2 | 6/2006 |

OTHER PUBLICATIONS

Chinese Office Action, dated Dec. 15, 2014, 7 pages.
Chinese Office Action, dated Apr. 30, 2014, 6 pages.
Machine translation for Kamauchi, JP 08-096792 A, 7 pages.

* cited by examiner

BIPOLAR BATTERY CURRENT COLLECTOR THAT CONTRACTS TO INTERRUPT A FLOW OF ELECTRIC CURRENT IN A DIRECTION THEREOF AND BIPOLAR BATTERY

CROSS REFERENCE TO RELATED APPLICATIONS

This application is a divisional of U.S. application Ser. No. 13/202,635, filed Aug. 22, 2011, which is the National Stage of Application No. PCT/JP2010/051084 filed on Jan. 28, 2010, which claims benefit of priority from the prior Japanese Application No. 2009-060124, filed on Mar. 12, 2009; the entire contents of all of which are incorporated herein by reference.

TECHNICAL FIELD

The present invention relates to a bipolar battery current collector and a bipolar battery.

BACKGROUND ART

In recent years, the reduction of carbon dioxide emissions has been sincerely desired for the purpose of environmental protection. The automotive industry has a growing expectation on the introduction of electric vehicles (EV) and hybrid electric vehicles (HEV) for the reduction of carbon oxide emissions and has increasingly developed motor-drive batteries, which become key to the practical application of these electric vehicles. Among various batteries for automotive uses, attentions are being given to bipolar batteries. The bipolar battery exhibits a high battery voltage as the flow of electric current through a current collector in a vertical direction (an electrode layer lamination direction) in the bipolar battery leads to short electron conduction passage and high output.

The bipolar battery has a collector as a structural part on both sides of which positive and negative electrode material layers are formed. Patent Document 1 teaches a collector containing a resin material for weight reduction.

PRIOR ART DOCUMENTS

Patent Documents

Patent Document 1:
Japanese Laid-Open Patent Publication No. 2004-164897

SUMMARY OF THE INVENTION

Problems to be Solved by the Invention

In the case of using a metal collector in the bipolar battery, the bipolar battery allows a flow of electric current through the metal collector in an in-plane direction thereof so as to, even if a battery structural part (e.g. separator) have variations in electrical resistance in its in-plane direction, avoid a current flow through a high electrical resistance area of the battery structural part and thereby not to cause local heat generation in the battery structural part. However, the resinous conductive collector as described in Patent Document 1 has higher electrical resistance in an in-plane direction than the metal collector. In the case of using such a resinous collector in the bipolar battery, the bipolar battery causes local heat generation by a continuous current flow through a high electrical resistance area of the battery structural part.

Means for Solving the Problems

It is therefore an object of the present invention to provide a technique for suppressing local heat generation in a bipolar battery for improvement in the durability of the bipolar battery.

The present inventors have made extensive researches to solve the above problems and, as a result, found that it is possible to suppress local heat generation in a bipolar battery and obtain improvement in battery durability by the use of a current collector formed with a conductive resin layer in such a manner as to, when at least part of the conductive resin layer reaches a predetermined temperature, interrupt a flow of electric current in the at least part of the conductive resin layer in a vertical direction thereof. The present invention is based on such a finding.

Namely, there is provided according to one aspect of the present invention a bipolar battery current collector, comprising a conductive resin layer formed in such a manner as to, when at least part of the conductive resin layer reaches a predetermined temperature, interrupt a flow of electric current in the at least part of the conductive resin layer in a vertical direction thereof.

There is provided according to another aspect of the present invention a bipolar battery comprising the above-mentioned current collector.

DETAILED DESCRIPTION

Figure 1:
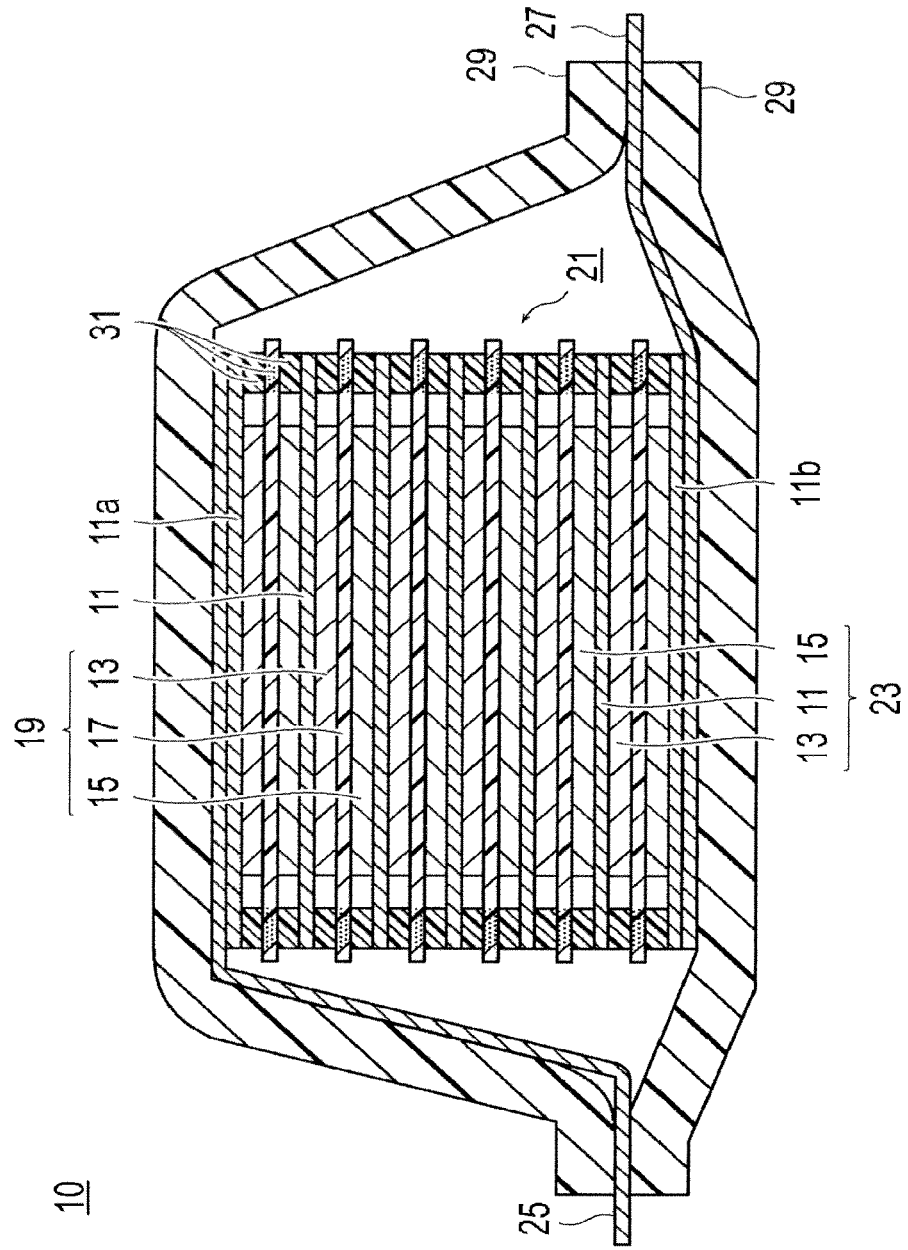
FIG. 1 is a schematic section view of a bipolar battery according to one embodiment of the present invention.

Exemplary embodiments of the present invention will be described in detail below with reference to the drawings. It should be herein noted that the present invention is not limited to the following embodiments. In the drawings, like parts and portions are designated by like reference numerals to omit repeated explanations thereof. Further, the dimensions of the respective parts and portions may be exaggerated for purposes of illustration in the drawings and may be different from the actual dimensions.

[Bipolar Battery]

There is no particular limitation on the structure or form of a bipolar battery according to one embodiment of the present invention. The bipolar battery can have any known structure such as a laminated (flat) battery structure or winding (cylindrical) battery structure.

There is also no particular limitation on the electrolyte form of the bipolar battery. As will be explained later in detail, the bipolar battery can be either a liquid electrolyte battery in which a separator is impregnated with a nonaqueous electrolytic solution, a polymer gel electrolyte battery also called a polymer battery, or a solid polymer electrolyte battery (all-solid-state electrolyte battery).

Further, there is no particular limitation on the materials of electrodes or metal ions transferring between the electrodes of the bipolar battery. Any known electrode material is usable. For example, the bipolar battery can be a lithium-ion secondary battery, a sodium-ion secondary battery, a potassium-ion secondary battery, a nickel-metal-hydride secondary battery, a nickel-cadmium secondary battery, a nickel-metal-hydride battery or the like. Preferably, the bipolar battery is in the form of a lithium-ion secondary battery. The lithium-ion secondary battery attains high energy density and output density because of high cell voltage (unit cell voltage) and exhibits superior performance as a vehicle driving power source or auxiliary power source. Thus, the lithium-ion secondary battery can suitably be used as a large capacity power source for an electric vehicle, a hybrid electric vehicle, a fuel cell vehicle, a hybrid fuel cell vehicle etc.

FIG. 1 is a schematic section view showing the overall structure of bipolar lithium-ion secondary battery 10 as one example of the bipolar battery according to the one exemplary embodiment of the present invention. Bipolar lithium-ion secondary battery 10 has substantially rectangular battery element 21, which actually undergoes a charge/discharge reaction, sealed in a battery package of laminate film 29.

Battery element 21 includes a plurality of bipolar electrodes 23 each having collector 11, positive electrode active material layer 13 electrically connected to one side of collector 11 and negative electrode active material layer 15 electrically connected to the other side of collector 11. These bipolar electrodes 23 are laminated together via electrolyte layers 17, thereby constituting battery element 21. There are provided separators as a substrate medium so that electrolyte layers 17 are formed by retaining an electrolyte material in planar center portions of the separators, respectively. Bipolar electrodes 23 and electrolyte layers 17 are alternately laminated on each other in such a manner that positive electrode active material layer 13 of either one of bipolar electrodes 23 faces negative electrode active material layer 15 of any other one of bipolar electrodes 23 adjacent to the aforementioned either one of bipolar electrodes 23 via electrolyte layer 17. Namely, electrolyte layer 17 is arranged between positive electrode active material layer 13 of the either one of bipolar electrodes 23 and negative electrode active material layer 15 of the any other one of bipolar electrodes 23 adjacent to the aforementioned either one of bipolar electrodes 23. These adjacently located positive electrode active material layer 13, electrolyte layer 17 and negative electrode active material layer 15 constitute unit cell 19. It can be thus said that bipolar lithium-ion secondary battery 10 has a laminated structure of unit cells 19. Outermost collector 11a is located as a positive-electrode-side outermost layer of battery element 21. Positive electrode active material layer 13 is formed only on one side of outermost collector 11a. Further, outermost collector 11b is located as a negative-electrode-side outermost layer of battery element 21. Negative electrode active material layer 15 is formed only on one side of outermost collector 11b. Alternatively, positive electrode active material layers 13 may be formed on both sides of positive-electrode-side outermost collector 11a; and negative electrode active material layer 15 may be formed on both sides of negative-electrode-side outermost collector 11b.

Bipolar lithium-ion secondary battery 10 also has a positive electrode collector plate 25 located adjacent to positive-electrode-side outermost collector 11a and led out from the battery package of laminate film 29 and a negative electrode collector plate 27 located adjacent to negative-electrode-side outermost collector 11b and led out from the battery package of laminate film 29.

In bipolar lithium-ion secondary battery 10, seal members 31 (insulation layers) are arranged at outer peripheries of unit cells 19 so as to perform the function of preventing not only the occurrence of a liquid junction due to electrolytic solution leakage from electrolyte layers 17 but also contact between adjacent collectors 11 in battery 10 and short circuit due to slight variations between ends of unit cells 19 in battery element 21. The arrangement of such seal members makes it possible that the bipolar lithium-ion secondary battery 10 can secure long-term reliability and safety and achieve high quality.

Herein, the number of lamination of unit cells 19 is adjusted depending on the desired battery voltage. It is feasible to decrease the number of lamination of unit cells 19 and thereby reduce the thickness of bipolar secondary battery 10 as long as bipolar secondary battery 10 can secure sufficient output. In bipolar lithium-ion secondary battery 10, battery element 21 is preferably vacuum-sealed in the battery package of laminate film 29, with some portions of positive and negative electrode collector plates 25 and 27 led out of laminate film 29, in order to protect battery element 21 from external impact and environmental deterioration during use.

The main structural parts of bipolar lithium-ion secondary battery 10 will be described in more detail below.

(Collector)

Collector 11 contains a conductive resin layer. Preferably, collector 11 is in the form of a conductive resin layer. The resin layer shows electrical conductivity, contains a resin material as an essential component, and performs a current collector function. In order for the resin layer to show electrical conductivity, it is feasible to form the resin layer using: 1) a conductive polymer material; or 2) a composition containing a resin and a conductive filler (conductive material).

The conductive polymer material can be from those that have electrical conductivity but do not allow conduction of ions as a charge transfer medium. It is estimated that the conductive polymer material shows electrical conductivity by the formation of an energy band with a conjugated polyene system thereof. There can be used a conductive polyene polymer that is known as a typical example of conductive polymer material and has been proceeding toward practical use in an electrolytic condenser etc. Specific examples of such a conductive polymer material are polyaniline, polypyrrole, polythiophene, polyacetylene, polyparaphenylene, polyphenylene vinylene, polyacrylonitrile, polyoxadiazole and any mixtures thereof. Among others, polyaniline, polypyrrole, polythiophene and polyacetylene are preferred in terms of electron conductivity and stable use in battery.

The conductive filler (conductive material) can be selected from those that have electrical conductivity. It is preferable that the conductive filler do not allow conduction of ions as a charge transfer medium for the purpose of limiting ion permeation in the conductive resin layer. Specific examples of such a conductive material are, but not limited to, aluminum, stainless steel (SUS), carbon material such as graphite or carbon black, silver, gold, copper and titanium. These conductive fillers can be used solely or in combination of two or more kinds thereof. There can also suitably be used alloys of these materials. Among others, silver, gold, aluminum, stainless steel and carbon material are preferred. Particularly preferred is carbon material. The conductive filler (conductive material) may be in the form of a particulate ceramic material or resin material coated with e.g. a plating of conductive material (the above-mentioned kind of conductive material).

The form (shape) of the conductive filler (conductive material) can be, but is not limited to, particle form. The conductive filler may alternatively be in any form other than particle form, such as carbon nanotube, that has been put into practical use as a so-called conductive resin filler composition.

As the carbon particles, carbon black and graphite can be used. The carbon particles such as carbon black and graphite have a very large potential window to be stable to a wide range of positive and negative potentials, show good electrical conductivity and save weight for minimization of weight increase. Further, the carbon particles are often also used as a conduction aid in the electrode layer and thus, even if brought into contact with the conduction aid, exhibit very low contact resistance due to the use of the same carbon material as the conductive filler and as the conduction aid. In the case of using the carbon particles as the conductive filler, it is feasible to subject the carbon particles to hydrophobic treatment so as to decrease the compatibility of the electrolyte material to the collector and thereby make it unlikely that the electrolyte material will penetrate into pores of the collector.

Although there is no particular limitation on the average particle size of the conductive filler, the average particle size of the conductive filler is preferably of the order of about 0.01 to 10 μm. In the present specification, the term "particle size" refers to a maximum distance L between any two points on the contour of a conductive filler particle. The term "average particle size" refers to an average of the particle sizes of conductive filler particles observed in several to several ten fields by observation means such as scanning electron microscope (SEM) or transmission electron microscope (TEM). The same definitions apply to the particle size and average particle size of the active materials as will be mentioned later.

In the case where the conductive filler is added into the resin layer, the resin composition of the resin layer may contain a nonconductive polymer material in addition to the conductive filler. The use of such a polymer material in the resin layer enhances binding of the conductive filler for improvement in battery reliability. The nonconductive polymer material can be selected from those having the ability to withstand positive and negative electrode potentials to be applied.

Examples of the nonconductive polymer material are polyethylene (PE), polypropylene (PP), polyethylene terephthalate (PET), polyether nitrile (PEN), polyimide (PI), polyamide (PA), polytetrafluoroethylene (PTFE), styrene-butadiene rubber (SBR), polyacrylonitrile (PAN), polymethylacrylate (PMA), polymethylmethacrylate (PMMA), polyvinyl chloride (PVC), polyvinylidene fluoride (PVdF), epoxy resin and any mixtures thereof. These nonconductive polymer materials have a very large potential window to be stable to either of positive and negative potentials and save weight for improvement in battery output density.

There is no particular limitation on the amount of the conductive filler in the resin layer. The amount of the conductive filler is preferably 1 to 30 mass % based on the total amount of the polymer material and the conductive filler. The addition of such a sufficient amount of conductive filler makes it possible to impart sufficient conductivity to the resin layer.

The resin layer may contain any additive component other than the conductive filler and the resin, but are preferably made of the conductive filler and the resin.

The resin layer can be formed by any known process such as spraying or coating process. More specifically, it is feasible to form the resin layer by preparing a slurry containing the polymer material and applying and curing the prepared slurry. As the polymer material for preparation of the slurry has been exemplified above, explanations of the polymer material will be omitted herefrom. The conductive filler may additionally be contained in the slurry. Explanations of the conductive filler will also be omitted herefrom as the conductive filler has been exemplified above. The conductive filler may be contained as the other component in the slurry. Explanations of the conductive filler particles will also be omitted herefrom as the conductive filler particles have been exemplified above. Alternatively, it is feasible to form the resin layer by mixing the polymer material, the conductive filler particles and the other additive component together by known mixing process and shaping the resulting mixture into a film. The resin layer may alternatively be formed by ink-jet process as disclosed in e.g. Japanese Laid-Open Patent Publication No. 2006-190649.

There is no particular limitation on the thickness of the collector. It is desirable that the thickness of the collector is as small as possible for improvement in battery output density. In the bipolar battery, the thickness of the resin collector can be decreased as there would be no problem even when the electrical resistance of the resin collector between the positive and negative electrode active material layers is high in a direction horizontal to a lamination direction. More specifically, the thickness of the collector is preferably 0.1 to 150 μm, more preferably 10 to 100 μm.

In the case of a bipolar battery with a conventional metal collector, the bipolar battery allows a flow of electric current through the metal collector in an in-plane direction thereof so as to, even if the battery structural part (e.g. separator) have variations in electrical resistance in an in-plane direction, avoid a current flow through a high electrical resistance area of the battery structural part and thereby not to cause local heat generation in the battery structural part. In the case of a bipolar battery with a resin collector, on the other hand, the bipolar battery causes local heat generation by a continuous current flow through a high electrical resistance area of the battery structural part as the resin collector has higher electrical resistance in an in-plane direction than the metal collector.

In order to suppress such local heat generation for improvement in battery durability, collector 11 is formed in such a manner as to, when at least part of the conductive resin layer reaches a predetermined temperature, interrupts a flow of electric current through the at least part of the conductive resin layer in a vertical direction thereof.

More specifically, it is one preferred embodiment to form a plurality of pores in collector 11 in such a manner that some part of collector 11 (at least part of the conductive resin layer) contracts to disconnect active material layer 13, 15 from collector 11 when it reaches the predetermined temperature by local heat generation.

Figure 2:
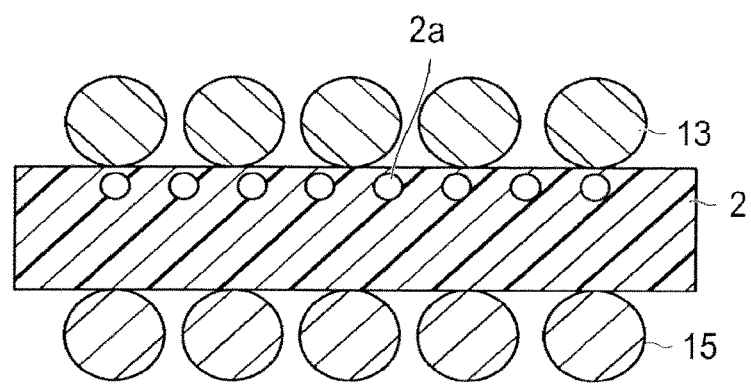
FIG. 2 is a schematic section view of an example of a current collector for use in the bipolar battery according to the one embodiment of the present invention.

FIG. 2 is a schematic section view showing one example of collector 11. In FIG. 2, collector 11 consists of conductive resin layer 2, wherein a plurality of pores 2a are formed in a positive-electrode-side surface of conductive resin layer 2. When some area reaches the predetermined temperature due to the occurrence of local heat generation in the battery structural part, at least vertical part of collector 11 (conductive resin layer 2) in such a predetermined temperature area contracts and becomes separated from positive electrode active material layer 13. In other words, collector 11 is disconnected from positive electrode active material layer 13 so as to interrupt the vertical flow of electric current in the disconnected part of collector 11. It is accordingly possible to suppress the local heat generation and improve the long-term reliability (durability) of bipolar battery.

Figure 3:
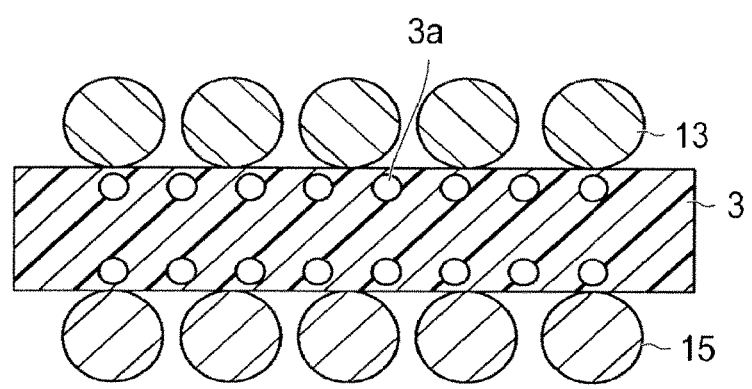
FIG. 3 is a schematic section view of an example of a current collector for use in the bipolar battery according to the one embodiment of the present invention.

FIG. 3 is a schematic section view showing another example of collector 11. In FIG. 3, collector 11 consists of conductive resin layer 3, wherein a plurality of pores 3a are formed in positive- and negative-electrode-side surfaces of conductive resin layer 3. When some area reaches the predetermined temperature due to the occurrence of local heat generation in the battery structural part, both of positive- and negative-electrode-side vertical parts of collector 11 (conductive resin layer 3) in such a predetermined temperature area contracts so that collector 11 can be easily disconnected from positive and negative electrode active material layers 13 and 15. It is thus easier to interrupt the vertical flow of electric current in the disconnected part of collector 11 and possible to suppress the local heat generation effectively and further improve the long-term reliability (durability) of bipolar battery.

Figure 4:
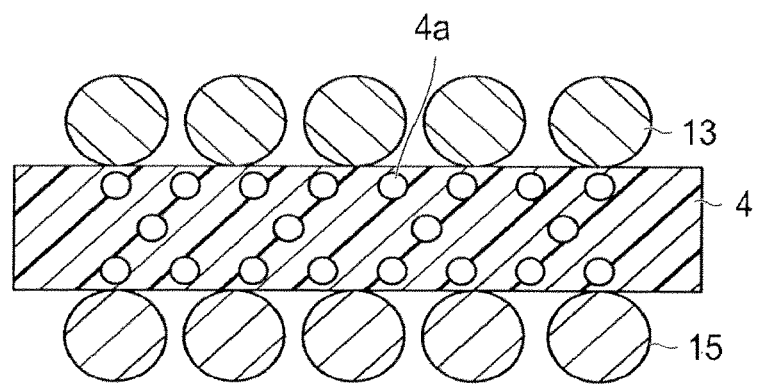
FIG. 4 is a schematic section view of an example of a current collector for use in the bipolar battery according to the one embodiment of the present invention.

FIG. 4 is a schematic section view showing another example of collector 11. In FIG. 4, collector 11 consists of conductive resin layer 4, wherein a plurality of pores 4a are formed in the whole of conductive resin layer 4 (i.e. in not only positive- and negative-electrode-side surfaces of conductive resin layer 4 but also in a center portion of conductive resin layer 4). When some area reaches the predetermined temperature due to the occurrence of local heat generation in the battery structural part, both of positive- and negative-electrode-side vertical parts of collector 11 (conductive resin layer 4) in such a predetermined temperature area contract so that collector 11 can be more easily disconnected from positive and negative electrode active material layers 13 and 15. It is thus more easier to interrupt the vertical flow of electric current in the disconnected part of collector 11 and possible to suppress the local heat generation more effectively and further improve the long-term reliability (durability) of bipolar battery.

Figure 5:
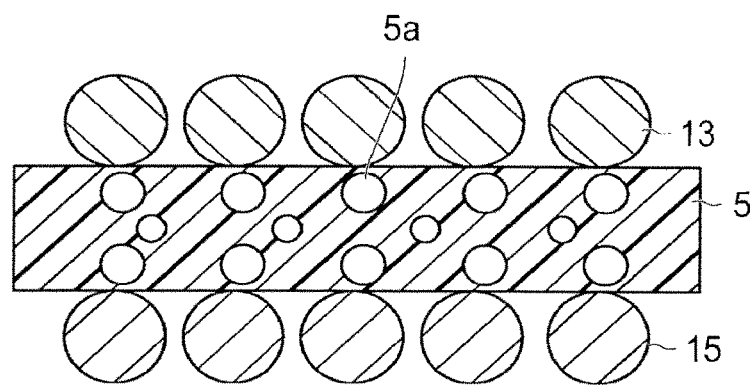
FIG. 5 is a schematic section view of an example of a current collector for use in the bipolar battery according to the one embodiment of the present invention.

FIG. 5 is a schematic section view showing another example of collector 11 (as a modification of FIG. 4). In FIG. 5, collector 11 consists of conductive resin layer 5, wherein a plurality of pores 5a are formed in the whole of conductive resin layer 5. The size of pores 5a present in positive- and negative-electrode-side surfaces of conductive resin layer 5 is made larger than the size of pores 5a present in a center portion of conductive resin layer 5. Further, the porosity of the positive- and negative-electrode-side surfaces of conductive resin layer 5 is made higher than the porosity of the center portion of conductive resin layer 5. When some area reaches the predetermined temperature due to the occurrence of local heat generation in the battery structural part, both of positive- and negative-electrode-side vertical parts of collector 11 (conductive resin layer 5) readily contract so that collector 11 can be still more easily disconnected from positive and negative electrode active material layers 13 and 15. It is thus still more easier to interrupt the vertical flow of electric current in the disconnected part of collector 11 and possible to suppress the local heat generation still more effectively and further improve the long-term reliability (durability) of bipolar battery.

As shown in FIGS. 4 and 5, it is preferable that the porosity of at least one of the positive- and negative-electrode-side surfaces of conductive resin layer 4, 5 of collector 11 is higher than the porosity of the center portion of conductive resin layer 4, 5. It is further preferable as shown in FIG. 5 that the size of pores 5a in at least one of the positive- and negative-electrode-side surfaces of conductive resin layer 5 is larger than the size of pores 5a in the center portion of conductive resin layer 5. As shown in FIGS. 2 and 3, no pores may not however be formed in the center portion of conductive resin layer 2, 3, i.e., the porosity of the center portion of conductive resin layer 2, 3 an be set to 0%.

The term "resin collector center portion" herein refers to that located within a range of 30 to 70% of the thickness of collector 11 in the vertical direction (thickness direction from the positive-electrode-side surface to the negative-electrode-side surface). Further, the term "pore size" refers to that measured by scanning electron microscope (SEM).

The porosity of the positive- or negative-electrode-side surface of conductive resin layer 2, 3, 4, 5 is preferably 5 to 80%, more preferably 10 to 60%. The porosity of the center portion of conductive resin layer 4, 5 is preferably 0 to 70%, more preferably 0 to 50%.

The size of pores 2a, 3a, 4a, 5a in the positive- or negative-electrode-side surface of conductive resin layer 2, 3, 4, 5 is preferably 0.1 to 20 µm, more preferably 1 to 10 µm. Further, the size of pores 4a, 5a in the center portion of conductive resin collector 4, 5 is preferably 0.5 to 10 µm, more preferably 1 to 5 µm.

There is no particular limitation on the process of formation of pores 2a, 3a, 4a, 5a in conductive resin layer 2, 3, 4, 5. For example, conductive resin layer 2, 3, 4, 5 can be formed with pores 2a, 3a, 4a, 5a by drawing a film of collector.

The arrangement of pores 2a, 3a, 4a, 5a is not limited to the above. Any pore arrangement is possible as long as collector 11 is capable of suppressing local heat generation by contraction of the vertical part of conductive resin layer 2, 3, 4, 5 in the area reaching the predetermined temperature.

Alternatively, it is another preferred embodiment to form the conductive resin layer of collector 11 using first and second polymers wherein the first polymer has a melting point lower than a melting point of the second polymer so that at least part of the first polymer melts and thereby contracts to disconnect active material layer 13, 15 from collector 11 when it reaches the predetermined temperature, in place of forming a plurality of pores in the conductive resin layer of collector 11.

As the first and second polymers, there can be used the above polymer materials. The combination of the first and second polymers is not particularly limited as long as the melting point of the first polymer is lower than the melting point of the second polymer.

For example, collector 11 can be formed with a low melting resin layer containing the first polymer and a high melting resin layer containing the second polymer.

Figure 6:
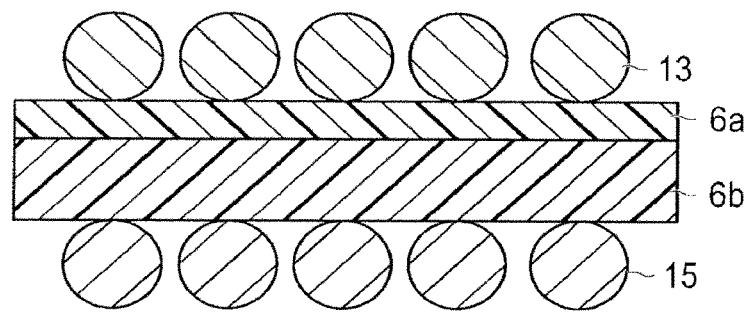
FIG. 6 is a schematic section view of an example of a current collector for use in the bipolar battery according to the one embodiment of the present invention.

FIG. 6 is a schematic section view showing one example of collector 11. In FIG. 6, collector 11 has low melting resin layer 6a containing the first polymer and high melting resin layer 6b containing the second polymer. Low melting resin layer 6a is located on a positive-electrode-side surface of high melting resin layer 6b. When some area reaches the predetermined temperature due to the occurrence of local heat generation in the battery structural part, at least vertical part of low melting resin layer 6a in such a predetermined temperature area melts and contracts so that collector 11 becomes disconnected from positive electrode active material layer 13 to interrupt the vertical flow of electric current in the disconnected part of collector 11. It is accordingly possible to suppress the local heat generation and improve the long-term reliability (durability) of bipolar battery.

Figure 7:
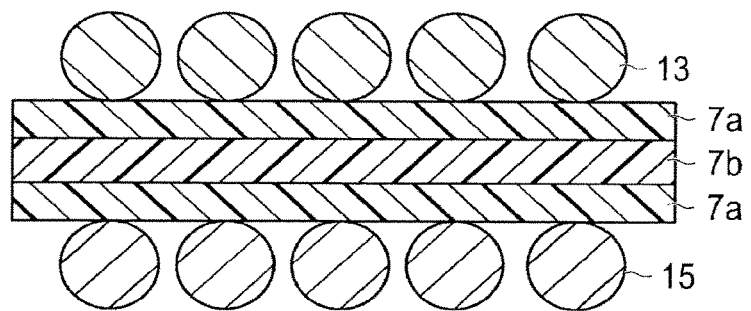
FIG. 7 is a schematic section view of an example of a current collector for use in the bipolar battery according to the one embodiment of the present invention.

FIG. 7 is a schematic section view showing another example of collector 11. In FIG. 7, collector 11 has low melting resin layers 7a containing the first polymer and high melting resin layer 7b containing the second polymer. Low melting resin layers 7a are located on positive- and negative-electrode-side surfaces of high melting resin layer 7b, respectively. When some area reaches the predetermined temperature due to the occurrence of local heat generation in the battery structural part, at least vertical parts of both positive- and negative-electrode-side low melting resin layers 7a in such a predetermined temperature area melt and contract so that collector 11 becomes easily disconnected from positive electrode active material layer 13. It is thus easier to interrupt the vertical flow of electric current in the disconnected part of collector 11 and possible to suppress the local heat generation more effectively and further improve the long-term reliability (durability) of bipolar battery.

Although the low melting resin layer containing the first polymer is located on the positive-electrode-side surface or both of the positive- and negative-electrode-side surfaces of the high melting resin layer containing the second polymer in FIG. 6 or 7, the location of the low melting resin layer containing the first polymer is not limited to above. The low melting resin layer containing the first polymer can be located on at least one of the positive- and negative-electrode-side surfaces of the high melting resin layer containing the second polymer.

In the case where the low melting resin layer containing the first polymer is located on the positive-electrode-side surface of the high melting resin layer containing the second polymer, the thickness of the low melting resin layer containing the first polymer is preferably twice or more larger than the average particle size of the positive electrode active material. On the other hand, the thickness of the low melting resin layer containing the first polymer is preferably twice or more larger than the average particle size of the negative electrode active material in the case where the low melting resin layer containing the first polymer is located on the negative-electrode-side surface of the high melting resin layer containing the second polymer. The reason for this is as follows. There are some active material particles partially embedded in the low melting resin layer containing the first polymer. If the thickness of the low melting resin layer containing the first polymer is smaller than the above thickness range, these some active material particles may be embedded through the low melting resin layer containing the first polymer and come into contact with the high melting resin layer containing the second polymer. As long as the active material particles are in contact with the high melting resin layer containing the second polymer, the collector cannot be disconnected from the active material layer even when the low melting resin layer containing the first polymer melts. It is thus preferable that the thickness of the low melting resin layer containing the first polymer is in the above thickness range in order to prevent contact between the active material and the high melting resin layer containing the second polymer.

There is no particular limitation on the process of formation of the resin collector with the low and high melting resin layers containing the first and second polymers. For example, the resin collector can be formed by bonding a film containing the first polymer and a film containing the second polymer together by any bonding process such as rolling or thermal fusion bonding.

Alternatively, collector 11 can be formed with a high melting layer containing the second polymer in which low melting particles containing the first polymer are dispersed.

Figure 8:
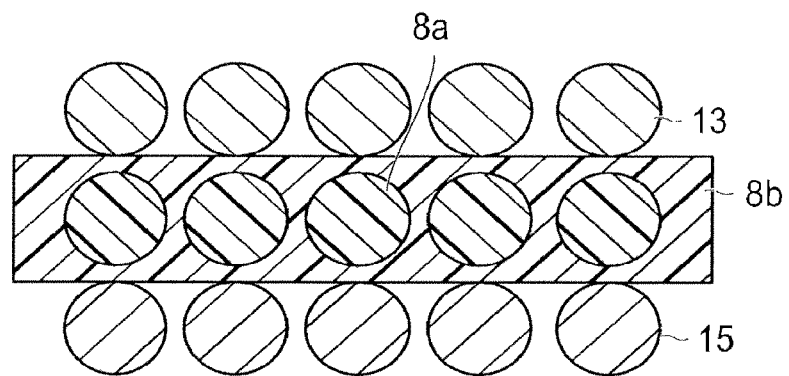
FIG. 8 is a schematic section view of an example of a current collector for use in the bipolar battery according to the one embodiment of the present invention.

FIG. 8 is a schematic section view showing one example of collector 11. In FIG. 8, collector 11 has high melting layer 8b containing the second polymer and low melting particles 8a containing the first polymer and located inside of high melting layer 8b. When some area reaches the predetermined temperature due to the occurrence of local heat generation in the battery structural part, low melting particles 8a containing the first polymer melt and contract so that collector 11 (high melting layer 8b containing the second polymer) becomes disconnected from positive and negative electrode active material layers 13 and 15 to interrupt the vertical flow of electrical current in such disconnected part. It is accordingly possible to suppress the local heat generation and improve the long-term reliability (durability) of bipolar battery. In this example, it is feasible to form collector 11 by mixing the first and second polymers together and shaping the resulting mixture into a film. In the case where at least one of the first and second polymers do not show electrical conductivity, the conductive filler may be mixed together with the first and second polymers.

Figure 9:
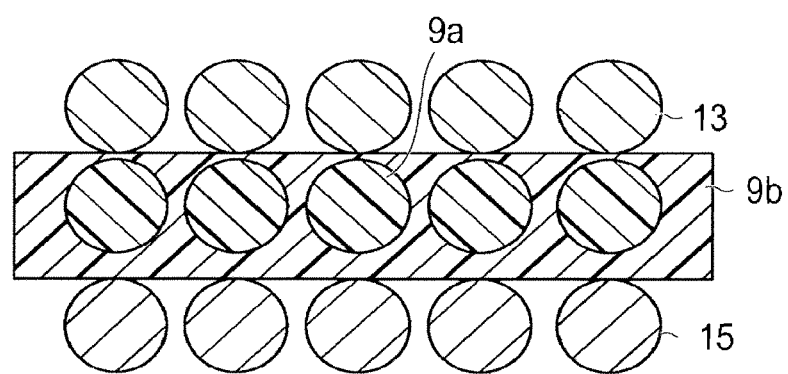
FIG. 9 is a schematic section view of an example of a current collector for use in the bipolar battery according to the one embodiment of the present invention.

FIG. 9 is a schematic section view showing another example of collector 11. In FIG. 9, collector 11 has high melting layer 9b containing the second polymer and low melting particles 9a containing the first polymer and located inside and in a positive-electrode-side surface of high melting layer 9b. Low melting particles 9a containing the first polymer may be provided adjacent to a negative-electrode-side surface of high melting layer 9b or in both of the positive- and negative-electrode surfaces of high melting layer 9b. When some area reaches the predetermined temperature due to the occurrence of local heat generation in the battery structural part, low melting particles 9a containing the first polymer readily melt and contract so that collector 11 (high melting layer 9b containing the second polymer)

becomes disconnected from positive and negative electrode active material layers 13 and 15 assuredly. It is thus possible to further improve the long-term reliability (durability) of bipolar battery. In this example, it is feasible to form collector 11 by mixing the first and second polymers together, shaping the resulting mixture into a film and bonding another film containing the second polymer to either positive- or negative-electrode side of the film by rolling, thermal fusion bonding etc. In the case where at least one of the first and second polymers do not show electrical conductivity, the conductive filler may be mixed together with the first and second polymers.

Figure 10:
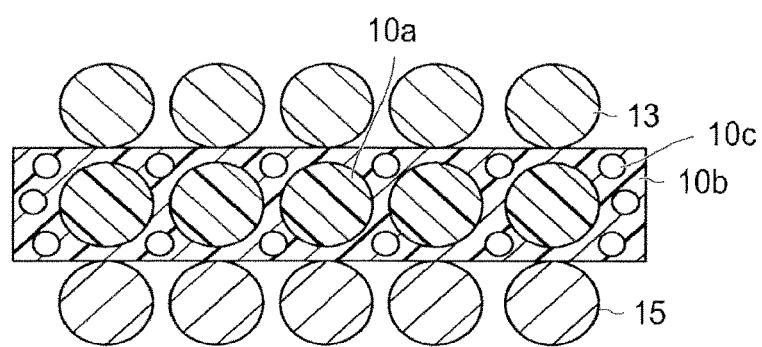
FIG. 10 is a schematic section view of an example of a current collector for use in the bipolar battery according to the one embodiment of the present invention.

FIG. 10 is a schematic section view showing another example of collector 11. In FIG. 10, collector 11 has high melting layer 10b containing the second polymer and low melting particles 10a containing the first polymer and located inside of high melting layer 10b, wherein a plurality of pores 10c are further formed in high melting layer 10b containing the second polymer. When some area reaches the predetermined temperature due to the occurrence of local heat generation in the battery structural part, low melting particles 10a containing the first polymer melt and flow into pores 10C of high melting layer 10b containing the second polymer so that collector 11 (high melting layer 10b containing the second polymer) more readily contract and becomes disconnected from positive and negative electrode active material layers 13 and 15 more assuredly. It is thus possible to further improve the long-term reliability (durability) of bipolar battery. In this example, it is feasible to form collector 11 by mixing the first and second polymers together, shaping the resulting mixture into a film, and then, drawing the film. In the case where at least one of the first and second polymers do not show electrical conductivity, the conductive filler may be mixed together with the first and second polymers.

(Active Material Layer)

Positive electrode active material layer 13 contains a positive electrode active material. Specific examples of the positive electrode active material are: lithium-transition metal composite oxides such as $LiMn_2O_4$, $LiCoO_2$, $Li(Ni—Co—Mn)O_2$ and those obtained by replacing parts of transition metal elements of the lithium-transition metal composite oxides with other elements; lithium-transition metal phosphate compounds; and lithium-transition metal sulfate compounds. In some cases, two or more kinds of positive electrode active materials may be used in combination. Among others, lithium-transition metal composite oxides are preferred as the positive electrode active material in term of capacity and output characteristics. It is needless to say that there can be used any positive electrode active material other than the above.

Negative electrode active material layer 15 contains a negative electrode active material. Specific examples of the negative electrode active material are: carbon materials such as graphite, soft carbon and hard carbon; and lithium-transition metal composite oxides (such as $Li_4Ti_5O_{12}$); metal materials; lithium alloy based negative electrode materials. In some cases, two or more kinds of negative electrode active materials may be used in combination. Among others, carbon materials and lithium-transition metal composite oxides are preferred as the negative electrode active material in term of capacity and output characteristics. It is needless to say that there can be used any negative electrode active material other than the above.

There is no particular limitation on the average particle size of the active material in each of active material layers 13 and 15. The average particle size of the active material is preferably 1 to 20 μm for improvement in output characteristics.

Further, each of active material layers 13 and 15 contains a binder.

There is no particular limitation on the binder used in active material layer 13, 15. Examples of the binder are: thermoplastic polymers such as polyethylene, polypropylene, polyethylene terephthalate (PET), polyether nitrile (PEN), polyacrylonitrile, polyimide, polyamide, cellulose, carboxymethyl cellulose (CMC), ethylene-vinyl acetate copolymer, polyvinyl chloride, styrene-butadiene rubber (SBR), isoprene rubber, butadiene rubber, ethylene-propylene rubber, ethylene-propylene-diene copolymer, styrene-butadiene-styrene block copolymer and hydrogenated product thereof, styrene-isoprene-styrene block copolymer and hydrogenated product thereof; fluoropolymers such as polyvinylidene fluoride (PVdF), polytetrafluoroethylene (PTFE), tetrafluoroethylene-hexafluoropropylene copolymer (FEP), tetrafluoroethylene-perfluoroalkylvinylether copolymer (PFA), ethylene-tetrafluoroethylene copolymer (ETFE), polychlorotrifluoroethylene (PCTFE), ethylene-chlorotrifluoroethylene copolymer (ECTFE) and polyvinyl fluoride (PVF); vinylidene fluoride-based fluororubbers such as vinylidene fluoride-hexafluoropropylene rubber (VDF-HFP rubber), vinylidene fluoride-hexafluoroproylene-tetrafluoroethylene rubber (VDF-HFP-TFE rubber), vinylidene fluoride-pentafluoropropylene rubber (VDF-PFP rubber), vinylidene fluoride-pentafluoropropylene-tetrafluoroethylene rubber (VDF-PFP-TFE rubber), vinylidene fluoride-perfluoromethylvinylether-tetrafluoroethylene rubber (VDF-PFMVE-TFE rubber) and vinylidene fluoride-chlorotrifluoroethylene rubber (VDF-CTF rubber); and epoxy resins. Among others, preferred are polyvinylidene fluoride, polyimide, styrene-butadiene rubber, carboxymethoxy cellulose, polypropylene, polytetrafluoroethylene, polyacrylonitrile and polyamide. These preferred binders are suitable for use in the active material layer as they show high heat resistance and have a very large potential window to be stable to either of positive and negative electrode potentials. The above binders can be used solely or in combination of two or more thereof.

There is also no particular limitation on the amount of the binder in active material layer 13, 15 as long as it is enough to bind the active material. The amount of the binder in active material layer 13, 15 is preferably 0.5 to 15 mass %, more preferably 1 to 10 mass %.

Each of active material layers 13 and 15 may contain an additive such as a conduction aid, an electrolytic salt (lithium salt), an ion-conductive polymer etc. as needed.

The conduction aid is an additive to improve the conductivity of active material layer 13, 15. Examples of the conduction aid are: carbon materials such as carbon black e.g. acetylene black, graphite and vapor grown carbon fiber. The conduction aid, when added to active material layer 13, 15, forms an electron network effectively within the inside of active material layer 13, 15 for improvement in battery output characteristics.

Examples of the electrolytic salt (lithium salt) are $Li(C_2F_5SO_2)_2N$, $LiPF_6$, $LiBF_4$, $LiClO_4$, $LiAsF_6$ and $LiCF_3SO_3$.

Examples of the ion-conductive polymer are polyethylene (PEO)- and polypropylene (PPO)-based polymers.

The component ratio of active material layer 13, 15 is not particularly limited and is adjusted as appropriate in the light of any knowledge about nonaqueous solvent secondary batteries. The thickness of active material layer 13, 15 is not also particularly limited and is adjusted in the light of any knowledge about batteries. For example, the thickness of active material layer 13, 15 can be set to about 20 to 100 μm.

(Electrolyte Layer)

There can be used a liquid electrolyte or a polymer electrolyte as the electrolyte material of electrolyte layer 17.

The liquid electrolyte is one in which a lithium salt as a support salt is dissolved in an organic solvent as a plasticizer. Examples of the organic solvent usable as the plasticizer are carbonates such as ethylene carbonate (EC) and propylene carbonate (PC). Examples of the support salt (lithium salt) are the same compounds as those usable in the electrode active material layer, such as LiBETI.

The polymer electrolyte can be classified into a gel electrolyte containing an electrolyte solution and an intrinsic polymer electrolyte containing no electrolyte solution.

The gel electrolyte is one in which the above liquid electrolyte is impregnated into an ion-conductive matrix polymer. Examples of the ion-conductive matrix polymer are polyethylene oxide (PEO), polypropylene oxide (PPO) and copolymers thereof. In these polyalkylene oxide-based polymers, the electrolytic salt such as lithium salt can be dissolved well.

The intrinsic polymer electrolyte is one in which the support salt (lithium salt) is dissolved in the above matrix polymer, without containing an organic solvent as a plasticizer. The formation of the electrolyte layer of such an intrinsic polymer electrolyte makes it is possible to obtain improvement in battery reliability with no fear of solution leakage from the battery.

The matrix polymer of the gel polymer electrolyte or intrinsic polymer electrolyte can provide good mechanical strength by formation of a cross-linking structure. In order to form such a cross-linking structure, it is feasible to subject a polymerizable material (such as PEO or PPO) for formation of the polymer electrolyte to any polymerization reaction such as thermal polymerization, ultraviolet polymerization, radiation induced polymerization or electron-beam induced polymerization with the use of any appropriate polymerization initiator.

In the case where the electrolyte layer is of liquid electrolyte, the separator is used to retain therein the electrolyte material. The polymer gel electrolyte and the intrinsic polymer electrolyte can be used solely or in the form of being impregnated in the separator. Examples of the separator are porous films of polyolefins such as polyethylene and polypropylene.

(Outermost Collector)

As the material of outermost collector 11*a*, 11*b*, there can be used metal and conductive polymer materials. In terms of ease of current output, metal material is preferably used. Examples of the metal material are metals aluminum, nickel, iron, stainless steel, titanium and copper. There can also suitably used a nickel-aluminum clad material, a copper-aluminum clad material and a plating material of any combination of the above metals. The outermost collector material may be in the form of an aluminum foil on metal surface. Among others, aluminum and copper are particularly preferred in terms of electron conductivity and battery operation potential.

(Seal Member)

Seal members 31 are provided to prevent a liquid junction due to electrolytic solution leakage from electrolyte layers 17, contact between adjacent collectors 11 in battery 10 and short circuit due to slight variations between ends of unit cells 19 in battery element 21.

Seal members 31 can be of any material having insulation property, sealing ability against falling of the solid electrolyte material, sealing ability (hermeticity) against moisture permeation from the outside as well as heat resistance under battery operation temperature conditions. Examples of such a material are urethane resin, epoxy resin, polyethylene resin, polypropylene resin, polyimide resin and rubber material. Among others, polyethylene resin and polypropylene resin are preferred as the material of seal members 31 in terms of corrosion resistance, chemical resistance, ease of formation (film formation property), cost efficiency and the like.

(Battery Package)

In the present embodiment, laminate film 29 is suitably used as the battery package because of its high output and cooling characteristics and applicability to large-equipment batteries such as EV and HEV batteries. Examples of laminate film 29 are aluminum laminate films such as a three-layer laminate film in which a polypropylene layer, an aluminum layer and a nylon layer are laminated in this order. Laminate film 29 is formed into e.g. a bag-shaped case so as to cover battery element 21. The form of laminate film 29 is not however limited to the above. As the battery package, there can alternatively be used a known metal can.

Figure 11:
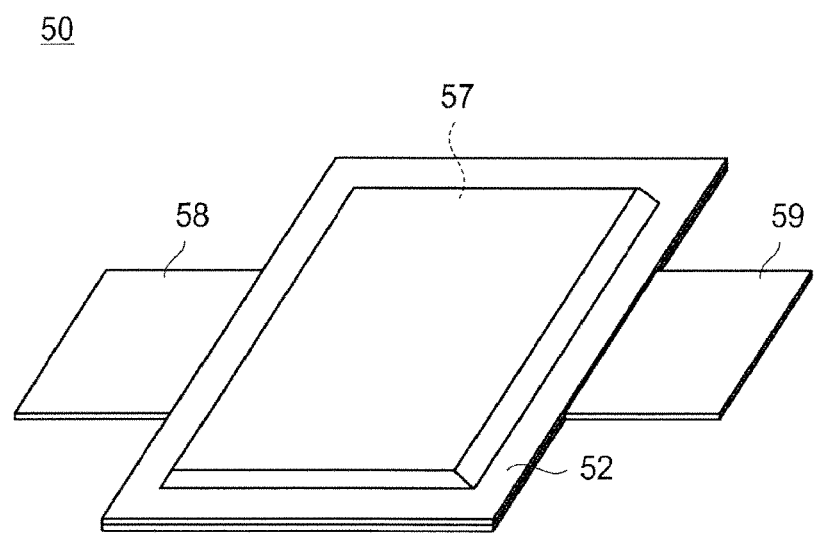
FIG. 11 is a perspective view showing an appearance of the bipolar battery according to the one embodiment of the present invention.

FIG. 11 is a perspective view showing the appearance of bipolar lithium-ion secondary battery 10. As shown in FIG. 11, lithium-ion secondary battery 10 has a rectangular flat shape. Heat generating element (battery element) 21 is enclosed and sealed in battery package 29 by thermal fusion of an outer peripheral portion of battery package 29.

Lithium-ion battery 10 is not limited to the above laminated flat shape and can alternatively be of winding cylindrical shape or rectangular flat shape formed by deformation of such cylindrical shape. In the case of the cylindrical battery structure, the package material is not particularly limited and can be a laminate film or a conventional cylindrical can (metal can). Preferably, the heat generating element (battery element) is packaged in the aluminum laminate film for reduction of weight in the present embodiment.

As shown in FIG. 11, positive and negative electrode tabs 58 and 59 may be used to take out electric current to the outside of lithium-ion secondary battery 10. These tabs 58 and 59 are electrically connected to outermost collectors 11*a* and 11*b* or collector plates 25 and 27 and led out of the battery package of laminate film 29 from both lateral sides. There is however no particular limitation on the lead-out of tabs 58 and 59. Positive and negative electrode tabs 58 and 59 can alternatively be led out from the same side, or can be divided into plural parts and led out from the respective sides. In the case of the winding battery structure, terminals may be formed using e.g. the cylindrical can (metal can) in place of the tabs.

There is no particular limitation on the materials of tabs 58 and 59. There can be used any known high-conductive material for lithium-ion secondary battery tabs. Suitable examples of the tab material are metal materials such as aluminum, copper, titanium, nickel, stainless steel (SUS) and alloys thereof. Among others, aluminum and copper are preferred in terms of lightweight, corrosion resistance and high conductivity. Positive and negative electrode tabs 58 and 59 can of the same kind of material or of different kinds of materials.

Positive and negative electrode terminal leads can also be used as needed. Any known materials for lithium-ion secondary battery terminal leads can be used as materials of the positive and negative electrode terminal leads. It is desirable to cover any parts led out of battery package 29 with e.g.

heat-resistant, heat-shrinkable insulating tubes so as not to cause ground fault upon contact with peripheral equipment or wiring and thereby not to affect the performance of the product (automotive part, notably electronic equipment).

Herein, bipolar battery 10 can be manufactured by any known manufacturing method.

[Battery Assembly]

A battery assembly is manufactured using at least two or more bipolar batteries 10 in the present embodiment. The capacity and voltage of the battery assembly is adjusted freely by serial or parallel connection of bipolar batteries 10.

Figure 12:
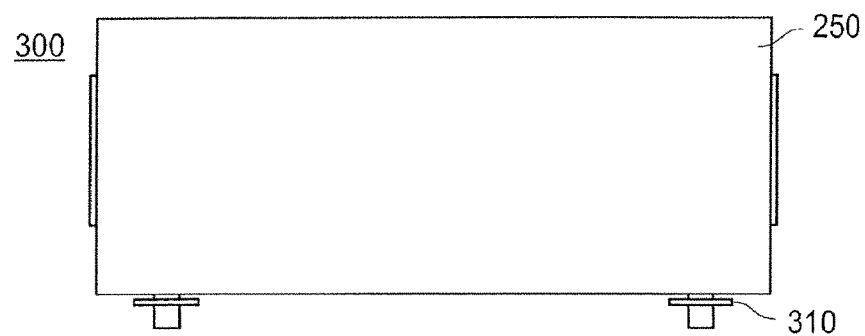
FIG. 12 is a plan view of a battery assembly according to one embodiment of the present invention.
Figure 13:
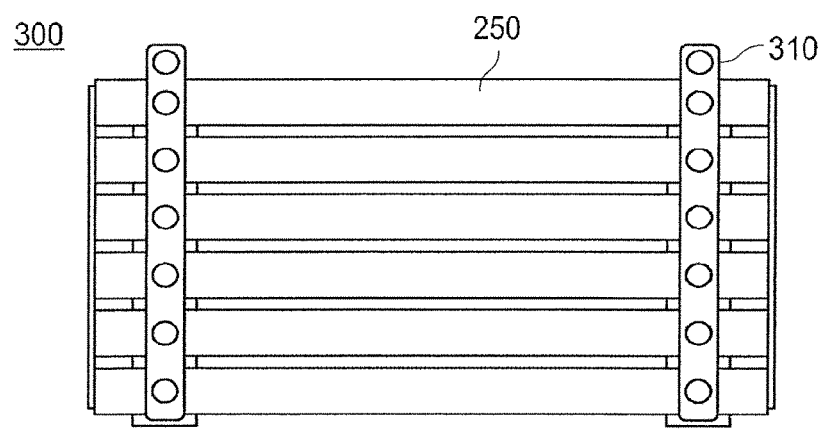
FIG. 13 is a front view of the battery assembly according to the one embodiment of the present invention.
Figure 14:
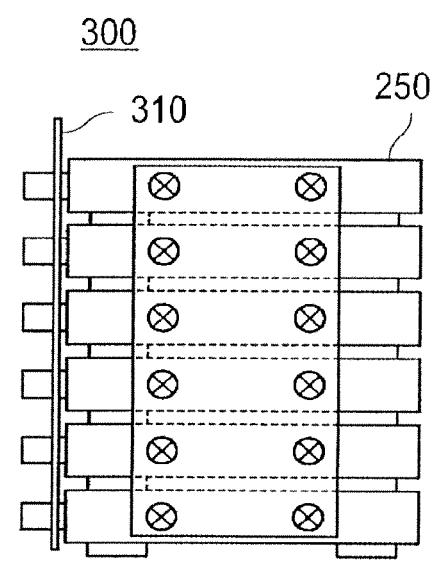
FIG. 14 is a side view of the battery assembly according to the one embodiment of the present invention.

FIGS. 12, 13 and 14 are a plan view, a front view and a side view showing the appearance of one example of battery assembly. As shown in FIGS. 12, 13 and 14, battery assembly 300 has a plurality of attachable/detachable small-size battery modules 250 electrically connected in series or in parallel. Each of battery modules 250 has a plurality of bipolar secondary batteries 10 electrically connected in series or in parallel. With such a configuration, battery assembly 300 can attain high capacity and good output characteristics suitable for use as a vehicle-driving power source or auxiliary power source where high volume energy density and high volume output density are required. Herein, battery modules 250 are electrically connected to each other via electrical connection means such as busbars and laminated in layers with the use of connection jig 310. The number of bipolar secondary batteries 10 in battery module 250 and the number of battery modules 250 in battery assembly 300 are determined depending on the battery capacity and output characteristics required of a vehicle (electric vehicle) on which battery assembly 300 is mounted.

[Vehicle]

Bipolar secondary battery 10 or the battery assembly in which a plurality of bipolar secondary batteries 10 are combined is suitable for use in a vehicle. In the present embodiment, bipolar secondary battery 10 has good long-term reliability and output characteristics and long life and thus can be mounted on a plug-in hybrid electric vehicle that features a long EV driving distance or an electric vehicle that features a long driving distance on a single charge. In other words, bipolar secondary battery 10 or the battery assembly in which a plurality of bipolar secondary batteries 10 are combined can suitably be used as a power source of the vehicle. Examples of the vehicle are automotive vehicles such as hybrid electric vehicles, electric vehicles and fuel-cell vehicles. These automotive vehicles refer to not only four-wheel vehicles (passenger cars, commercial cars e.g. trucks and buses, light cars etc.) but also two-wheel vehicles (motorbikes etc.) and three-wheel vehicles. The application of bipolar secondary battery 10 or the battery assembly in which a plurality of bipolar secondary batteries 10 are combined is not limited to the above automotive vehicles. Bipolar secondary battery 10 or the battery assembly in which a plurality of bipolar secondary batteries 10 are combined can be applied as power sources for any other vehicles e.g. transportation means such as trains and as mountable/installable power supplies such as uninterruptible power supplies.

EXAMPLES

The present invention will be described in more detail below by way of the following examples. In the following examples, the porosity was measured with a mercury porosimeter (manufactured by Micromeritics Instrument Corporation, product number: AutoPore IV9510); and the pore size was determined by observation with a SEM (manufactured by Hitachi Ltd., S-4000).

Example 1

A bipolar secondary battery was manufactured in the following process steps.

1. Production of Collector

A conductive resin slurry was prepared by providing a single-liquid uncured epoxy resin (95 mass %) as a nonconductive polymer material (resin) and carbon black (average particle size: 0.1 µm) (5 mass %) as a conductive filler and kneading the thus-provided solid matter at 50° C. Further, a release film of poly(ethylene terephthalate) (PET) was provided. The conductive resin slurry was applied to and dried on the film, thereby forming a resin layer in which the carbon particles were dispersed in the epoxy resin. The thus-formed resin layer was subjected to drawing with a drawing machine. By this, an electrically-conductive, carbon black-dispersed epoxy resin film (hereinafter also referred to as film A) having a porosity of 30%, a pore size of 3 mm and a thickness of 100 µm was obtained as a collector.

2. Formation of Positive and Negative Electrode Layers

Solid matter was provided including 95 mass % of $LiMn_2O_4$ (average particle size: 10 µm) as a positive electrode active material, 5 mass % of acetylene black as a conduction aid, 10 mass % of PVdF as a binder. A positive electrode material slurry was prepared by adding an appropriate amount of N-methyl-2-pyrrolidone (NMP) to the solid matter. A positive electrode layer was formed on one side of the collector produced in the above section 1 by applying thereto and drying the positive electrode active material paste. The positive electrode layer was then pressed to a thickness of 36 µm.

A negative electrode material slurry was prepared by mixing 90 mass % of hard carbon (average particle size: 10 µm) as a negative electrode active material and 10 mass % of PVdF as a binder with an appropriate amount of NMP as a slurry viscosity adjusting solvent. A negative electrode layer was formed on the other side of the collector produced in the above section 1 by applying thereto and drying the negative electrode active material paste. The negative electrode layer was then pressed to a thickness of 30 µm. There was thus obtained a bipolar electrode having the positive electrode layer formed at one side thereof and the negative electrode layer formed at the other side thereof.

The thus-obtained bipolar electrode was cut into a size of a size of 140×90 mm, with no active material layers applied to a width of 10 mm around an outer peripheral portion of the electrode material. Namely, the bipolar electrode was provided with an electrode portion of 120×90 mm in size and an outer peripheral seal portion of 10 mm in width as a seal margin.

An electrolyte material (pre-gel material) was prepared by mixing 90 mass % of an electrolytic solution of 1.0 M $LiPF_6$ in propylene carbonate (PC)-ethylene carbonate (EC) solvent (1:1 (volume ratio)), 10 mass % of a polyvinylidene fluoride-hexafluoropropylene copolymer (PVdF-HFP) containing 10 mass % HFP component and DMC as a slurry viscosity adjusting solvent.

The electrolyte material (pre-gel material) was applied to the whole of the positive and negative electrode layers of both sides of the electrode portion of the bipolar electrode, followed by drying at room temperature to remove the DMC solvent therefrom. The bipolar electrode was thus completed with the gel electrolyte material impregnated in the electrode layers. The thickness of the positive electrode layer and the thickness of the negative electrode layer remained 36 μm and 30 μm, respectively.

3. Preparation of Gel Polymer Electrolyte Layer

The above-prepared electrolyte material (pre-gel material) was also applied to both sides of a porous film separator of polypropylene (thickness: 20 μm), followed by drying at room temperature to remove the DMC solvent therefrom and thereby form a gel polymer electrolyte layer (thickness: 20 μm).

4. Lamination

The gel electrolyte layer was placed on the positive electrode layer of the bipolar electrode. APE (polyethylene) film of 12 mm in width and 100 μm in thickness was placed as a seal material around the gel electrode layer on the bipolar electrode. The above procedure was repeated to laminate the bipolar electrodes together in six layers. The seal materials were subjected to pressing (heat and pressure) from both top and bottom sides and thereby fused (press conditions: 0.2 MPa, 160° C., 5 s) to form seal members to seal the respective layers.

Electrode collector plates (electrical terminals) were prepared for the resulting battery element, each of which had an Al plate (as an electrode collector plate) of 100 μm in thickness and 130 mm×80 mm in size so as to cover the whole of a horizontal surface of the battery element, with a portion thereof (as an electrode tab, width: 20 mm) extending to the outside of the horizontal surface of the battery element. The battery element was sandwiched between these electrode collector plates, and then, enclosed and vacuum-sealed in a battery package of aluminum laminate film. By this, the whole of the battery element was pressurized from both sides by the force of atmospheric pressure. As a result, there was obtained a five-serial-cell bipolar secondary battery structure (in which five unit cells were connected in series) with increased contact of the battery element and the electrode collector plates.

5. Press of Bipolar Secondary Battery Structure

The above-obtained bipolar secondary battery structure was subjected to hot pressing at a surface pressure of 1 kg/cm$^2$ and at a temperature of 80° C. for 1 hour, so as to cure the uncured seal portion (epoxy resin) of the bipolar battery structure. In this way, the bipolar secondary battery was completed. The seal portion was pressed to a given thickness and cured in this process step.

Example 2

Two sheets of electrically-conductive, carbon black-dispersed epoxy resin film having a porosity of 45%, a pore size of 3 μm and a thickness of 100 μm (hereinafter also referred to as "Film B") and one sheet of electrically-conductive, carbon black-dispersed epoxy resin film having a porosity of 0% and a thickness of 100 μm (hereinafter also referred to as "Film C") were formed in the same manner as in Example 1, except for changing the drawing conditions in the process step 1. The thus-formed conductive resin films were laminated together in order of Film B, Film C and Film B and subjected to drawing, thereby producing a collector having a laminated structure of three conductive resin layers. A bipolar secondary battery was manufactured in the same manner as in Example 1, except that the bipolar electrodes were each produced using the above-obtained collector.

Example 3

Collectors each having a laminated structure of two conductive resin layers were produced by forming one sheet of Film B and one sheet of Film C, laminating the films together and subjecting the film laminate to drawing in the same manner as in Example 2. A bipolar secondary battery was manufactured in the same manner as in Example 1, except that the bipolar electrodes were each produced by applying and drying the positive electrode material slurry onto Film-B-side surfaces of the respective collectors and pressing the resulting positive electrode layers to a thickness of 36 μm while applying and drying the negative electrode material slurry onto Film-C-side surfaces of the respective collectors and pressing the resulting negative electrode layer to a thickness of 30 μm.

Example 4

One sheet of Film B and one sheet of Film C were formed, laminated together and subjected to drawing in the same manner as in Example 2, thereby producing a collector having a laminated structure of two conductive resin layers. A bipolar secondary battery was manufactured in the same manner as in Example 1, except that the bipolar electrodes were each produced by applying and drying the positive electrode material slurry onto Film-C-side surfaces of the respective collectors and pressing the resulting positive electrode layers to a thickness of 36 μm while applying and drying the negative electrode material slurry onto Film-B-side surfaces of the respective collectors and pressing the resulting negative electrode layer to a thickness of 30 μm.

Example 5

Two sheets of electrically-conductive, carbon black-dispersed epoxy resin film having a porosity of 40%, a pore size of 3 μm and a thickness of 100 μm (hereinafter also referred to as "Film D") and one sheet of electrically-conductive, carbon black-dispersed epoxy resin film having a porosity of 20%, a pore size of 3 μm and a thickness of 100 μm (hereinafter also referred to as "Film E") were formed in the same manner as in Example 1, except for changing the drawing conditions in the process step 1. The thus-formed resin films were laminated together in order of Film D, Film E and Film D and subjected to drawing, thereby producing a collector having a laminated structure of three conductive resin layers. A bipolar secondary battery was manufactured in the same manner as in Example 1, except that the bipolar electrodes were each produced using the above-obtained collector.

Example 6

Two sheets of electrically-conductive, carbon black-dispersed epoxy resin film having a porosity of 40%, a pore size of 5 μm and a thickness of 100 μm (hereinafter also referred to as "Film F") were formed in the same manner as in Example 1, except for changing the drawing conditions in the process step 1. Further, one sheet of Film E was formed in the same manner as in Example 5. The thus-formed resin films were laminated together in order of Film F, Film E and Film F and subjected to drawing, thereby producing a collector having a laminated structure of three conductive resin layers. A bipolar secondary battery was manufactured in the same manner as in Example 1, except that the bipolar electrodes were each produced using the above-obtained collector.

Comparative Example

A bipolar secondary battery was produced in the same manner as in Example 1, except for performing no drawing with a drawing machine in the process step 1. Namely, each of the collectors used was a carbon black-dispersed epoxy resin film with no pores (hereinafter also referred to as "Film G").

The configurations of the collectors of Examples 1-6 and Comparative Example are indicated in TABLE 1.

TABLE 1

| | Collector: porosity (%) | | | Pore size (μm) | | |
|---|---|---|---|---|---|---|
| | Positive electrode side | Center portion | Negative electrode side | Positive electrode side | Center portion | Negative electrode side |
| Example 1 | 30 | 30 | 30 | 3 | 3 | 3 |
| Example 2 | 45 | 0 | 45 | 3 | 0 | 3 |
| Example 3 | 45 | 0 | 0 | 3 | 0 | 0 |
| Example 4 | 0 | 0 | 45 | 0 | 0 | 3 |
| Example 5 | 40 | 20 | 40 | 3 | 3 | 3 |
| Example 6 | 40 | 20 | 40 | 5 | 3 | 5 |
| Comparative Example | 0 | 0 | 0 | 0 | 0 | 0 |

Example 7

Two sheets of electrically-conductive, carbon black-dispersed polyethylene film of 100 μm in thickness (hereinafter also referred to as film H) by dispersing polyethylene particles and carbon black in an organic solvent, blending the dispersed mixture with a kneader, forming the kneaded slurry into a sheet, drying the sheet to remove the organic solvent, and then, drawing the sheet into a film shape with a drawing machine. Further, one sheet of carbon black-dispersed epoxy film (Film G) was formed in the same manner as in Comparative Example. The thus-formed resin films were laminated together in order of Film H, Film G and Film H and subjected to drawing, thereby producing a collector having a laminated structure of three conductive resin layers. A bipolar secondary battery was manufactured in the same manner as in Example 1, except that the bipolar electrodes were each produced using the above-obtained collector.

Example 8

One sheet of Film G and one sheet of Film H were formed, laminated together and subjected to drawing in the same manner as above, thereby producing a collector having a laminated structure of two conductive resin layers. A bipolar secondary battery was manufactured in the same manner as in Example 1, except that the bipolar electrodes were each produced by applying and drying the positive electrode material slurry onto Film-H-side surfaces of the respective collectors and pressing the resulting positive electrode layers to a thickness of 36 μm while applying and drying the negative electrode material slurry onto Film-G-side surfaces of the respective collectors and pressing the resulting negative electrode layer to a thickness of 30 μm.

Example 9

One sheet of Film G and one sheet of Film H were formed, laminated together and subjected to drawing in the same manner as above, thereby producing a collector having a laminated structure of two conductive resin layers. A bipolar secondary battery was manufactured in the same manner as in Example 1, except that the bipolar electrodes were each produced by applying and drying the positive electrode material slurry onto Film-G-side surfaces of the respective collectors and pressing the resulting positive electrode layers to a thickness of 36 μm while applying and drying the negative electrode material slurry onto Film-H-side surfaces of the respective collectors and pressing the resulting negative electrode layer to a thickness of 30 μm.

The configurations of the collectors of Examples 7-9 are indicated in TABLE 2.

TABLE 2

| | Collector material | | |
|---|---|---|---|
| | Positive electrode side | Center portion | Negative electrode side |
| Example 7 | polyethylene | epoxy | polyethylene |
| Example 8 | polyethylene | epoxy | epoxy |
| Example 9 | epoxy | epoxy | polyethylene |

Example 10

A carbon black-dispersed epoxy resin film of 100 μm in thickness having dispersed therein carbon black-dispersed polyethylene particles (hereinafter also referred to as "Film I") was formed by blending an epoxy resin and polyethylene particles together with a kneader, forming the blend into a sheet and drawing the sheet into a film shape with a drawing machine. A bipolar secondary battery was manufactured in the same manner as in Example 1, except that the bipolar electrodes were each produced using Film I as the collector. The mixing ratio of the carbon black-dispersed polyethylene particles and the carbon black-dispersed epoxy resin in Film I was 40:60 (mass ratio).

Example 11

One sheet of Film G and one sheet of Film I were formed, laminated together and subjected to rolling in the same manner as above, thereby producing a collector having a laminated structure of two conductive resin layers. A bipolar secondary battery was manufactured in the same manner as in Example 1, except that the bipolar electrodes were each produced by applying and drying the positive electrode material slurry onto Film-I-side surfaces of the respective collectors and pressing the resulting positive electrode layers to a thickness of 36 μm while applying and drying the negative electrode material slurry onto Film-G-side surfaces of the respective collectors and pressing the resulting negative electrode layers to a thickness of 30 μm

Example 12

A carbon black-dispersed epoxy resin film of 100 μm in thickness and 30% in porosity having dispersed therein carbon black-dispersed polyethylene particles (hereinafter also referred to as "Film J") was formed by blending an epoxy resin and polyethylene particles together with a kneader, forming the blend into a sheet and drawing the sheet into a film shape with a drawing machine. A bipolar secondary battery was manufactured in the same manner as in Example 1, except that the bipolar electrodes were each produced using Film J as the collector. The mixing ratio of the carbon black-dispersed polyethylene particles and the carbon black-dispersed epoxy resin in Film J was 40:60 (mass ratio).

The configurations of the collectors of Examples 10-12 are indicated in TABLE 3.

TABLE 3

| | Low melting particles in collector | | | Base material porosity (%) |
|---|---|---|---|---|
| | Positive electrode side | Center portion | Negative electrode side | |
| Example 10 | present | present | present | 0 |
| Example 11 | present | absent | absent | 0 |
| Example 12 | present | present | present | 30 |

Evaluation: Charge/Discharge Test

Each of the bipolar secondary batteries of Examples 1-12 and Comparative Example was subjected to charge/discharge test. In one test cycle, the battery was charged to 21.0 V at a constant current (CC) of 0.5 C and then further charged with a constant voltage (CV). The total charge time was 10 hours. After that, the battery was discharged at a discharge capacity of 1 C. The durability of the battery was tested by capacity measurements after 100 test cycles. The test results are indicated in TABLE 4. In TABLE 4, the capacity retention (%) refers to the ratio of the discharge capacity after 100 test cycles to the initial discharge capacity; and the capacity improvement rate relative to Comparative Example refers to the ratio (relative value) of the capacity retention of Example or Comparative Example assuming the capacity retention of Comparative Example as 1.00.

Capacity retention=Discharge capacity (Ah) after 100 test cycles/Initial discharge capacity (Ah)×100 (%).

Capacity improvement rate=Capacity retention of Example or Comparative Example/Capacity retention of Comparative Example (%).

TABLE 4

| | Capacity retention (%) | Capacity improvement rate relative to comparative example |
|---|---|---|
| Example 1 | 85 | 1.21 |
| Example 2 | 92 | 1.31 |
| Example 3 | 88 | 1.26 |
| Example 4 | 87 | 1.24 |
| Example 5 | 94 | 1.34 |
| Example 6 | 95 | 1.36 |
| Example 7 | 85 | 1.21 |
| Example 8 | 90 | 1.29 |
| Example 9 | 89 | 1.27 |
| Example 10 | 88 | 1.26 |
| Example 11 | 92 | 1.31 |
| Example 12 | 95 | 1.36 |
| Comparative Example | 70 | 1.00 |

As is apparent from the results of TABLE 4, it has been confirmed that the bipolar secondary batteries of Examples 1 to 12 had improved capacity retention and long-term reliability (durability) as compared to the bipolar secondary battery of Comparative Example.

The invention claimed is:

1. A bipolar battery current collector having a layer shape and being made of a conductive resin material containing thermosetting resin,
   wherein the bipolar battery current collector has a plurality of pores formed therein,
   wherein a porosity of at least one of a positive-electrode-side surface or a negative-electrode-side surface of the bipolar battery current collector is higher than a porosity of a center portion of the bipolar battery current collector such that the bipolar battery current collector is contractable to interrupt a flow of electric current through at least part of the bipolar battery current collector in a vertical direction thereof,
   wherein the conductive resin material comprises a conductive resin polymer material, and
   wherein the conductive resin polymer material comprises polyaniline, polypyrrole, polythiophene, polyacetylene, polyparaphenylene, polyphenylene vinylene, polyacrylonitrile, polyoxadiazole or any mixtures thereof.

2. The bipolar battery current collector according to claim 1, wherein a size of the pores present in the at least one of the positive-electrode-side surface or the negative-electrode-side surface of the bipolar battery current collector is larger than a size of the pores present in the center portion of the bipolar battery current collector.

3. The bipolar battery current collector according to claim 1, wherein the conductive resin material contains a first polymer and a second polymer; and wherein the first polymer has a melting point lower than a melting point of the second polymer such that at least part of the first polymer melts to cause contraction of the bipolar battery current collector and thereby interrupt the flow of electric current through the at least part of the bipolar battery current collector.

4. The bipolar battery current collector according to claim 3, wherein the bipolar battery current collector comprises a first layer containing the first polymer and a second layer containing the second polymer.

5. The bipolar battery current collector according to claim 4, wherein the first layer is located on at least one surface of the second layer.

6. The bipolar battery current collector according to claim 3, wherein the bipolar battery current collector comprises a polymer layer containing the second polymer and polymer particles containing the first polymer and located in the polymer layer.

7. The bipolar battery current collector according to claim 6, wherein the polymer particles are located in a surface of the polymer layer.

8. The bipolar battery current collector according to claim 7, wherein a plurality of pores are formed in the polymer layer.

9. A bipolar battery comprising: the bipolar battery current collector according to claim 1.

10. The bipolar battery current collector according to claim 1, wherein the thermosetting resin is epoxy resin.

11. The bipolar battery according to claim 9, further comprising:
    a positive electrode active material layer electrically connected to one side of the bipolar battery current collector; and
    a negative electrode active material layer electrically connected to an other side of the bipolar battery current collector,
    wherein at least one of the positive electrode active material layer or the negative electrode active material layer is disconnected from the bipolar battery current collector by contraction of the bipolar battery current collector, thereby interrupting the flow of electric current through at least part of the bipolar battery current collector in a vertical direction thereof.

12. A current collector for a bipolar battery, comprising a layer-shaped collector body having one side on which a positive electrode active material layer of the bipolar battery is formed and the other side on which a negative electrode active material layer of the bipolar battery is formed, wherein the collector body is made of a conductive resin material containing thermosetting resin, wherein the collector body has a plurality of pores formed therein, wherein a porosity of at least one of the one side or the other side of the collector body is higher than a porosity of a center portion of the collector body such that the collector body contracts at a predetermined temperature so as to disconnect either the positive electrode active material layer or the negative electrode active material layer from at least part of the collector body and thereby interrupt a flow of electric current through the at least part of the collector body in a vertical direction thereof, wherein the conductive resin material comprises a conductive resin polymer material, and wherein the conductive resin polymer material comprises polyaniline, polypyrrole, polythiophene, polyacetylene, polyparaphenylene, polyphenylene vinylene, polyacrylonitrile, polyoxadiazole or any mixtures thereof.

13. A bipolar battery, comprising:

a layer-shaped current collector;

a positive electrode active material layer formed on one side of the current collector; and a negative electrode active material layer formed on an other side of the current collector, wherein the current collector is made of a conductive resin material containing thermosetting resin, wherein the current collector has a plurality of pores formed therein, wherein a porosity of at least one of the one side or the other side of the current collector is higher than a porosity of a center portion of the current collector such that a current collector body contracts at a predetermined temperature so as to disconnect either the positive electrode active material layer or the negative electrode active material layer from at least part of the current collector and thereby interrupt a flow of electric current through the at least part of the current collector in a vertical direction thereof, wherein the conductive resin material comprises a conductive resin polymer material, and wherein the conductive resin polymer material comprises polyaniline, polypyrrole, polythiophene, polyacetylene, polyparaphenylene, polyphenylene vinylene, polyacrylonitrile, polyoxadiazole or any mixtures thereof.

14. The bipolar battery current collector according to claim 1, wherein the porosity of the at least one of the positive- or negative-electrode-side surfaces of the bipolar battery current collector is in a range of 5 to 80%; and wherein the porosity of the center portion of the bipolar battery current collector is in a range of 0 to 70%.

15. The bipolar battery current collector according to claim 14, wherein the porosity of the at least one of the positive- or negative-electrode-side surfaces of the bipolar battery current collector is in a range of 10 to 60%; and wherein the porosity of the center portion of the bipolar battery current collector is in a range of 0 to 50%.

16. The bipolar battery current collector according to claim 2, wherein the size of the pores in the at least one of the positive- or negative-electrode-side surfaces of the bipolar battery current collector is in a range of 0.1 to 20 μm; and wherein the size of the pores in the center portion of the bipolar battery current collector is in a range of 0.5 to 10 μm.

17. The bipolar battery current collector according to claim 16, wherein the size of the pores in the at least one of the positive- or negative-electrode-side surfaces of the bipolar battery current collector is in a range of 1 to 10 μm; and wherein the size of the pores in the center portion of the bipolar battery current collector is in the range of 1 to 5 μm.

18. The bipolar battery current collector according to claim 12, wherein the porosity of the at least one of the one side or the other side of the collector body is in a range of 5 to 80%; and wherein the porosity of the center portion of the collector body is in a range of 0to 70%.

19. The bipolar battery according to claim 13, wherein the porosity of the at least one of the one side or the other side of the current collector is in a range of 5 to 80%; and wherein the porosity of the center portion of the current collector is in a range of 0to 70%.

* * * * *